(No Model.)
J. E. HIGDON.
BALL BEARING.
No. 585,574.　　　　　　　　Patented June 29, 1897.
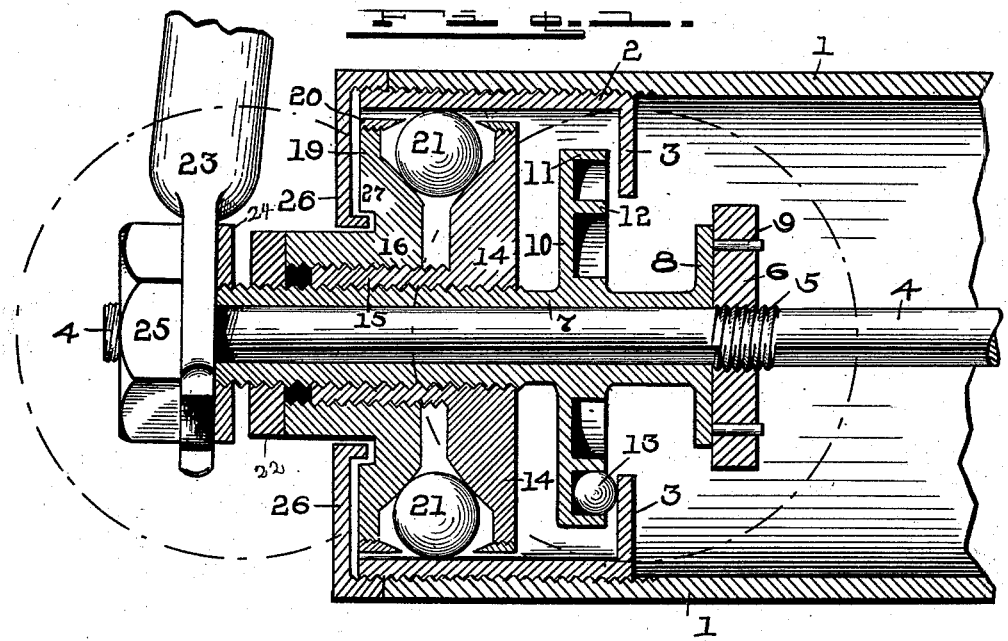
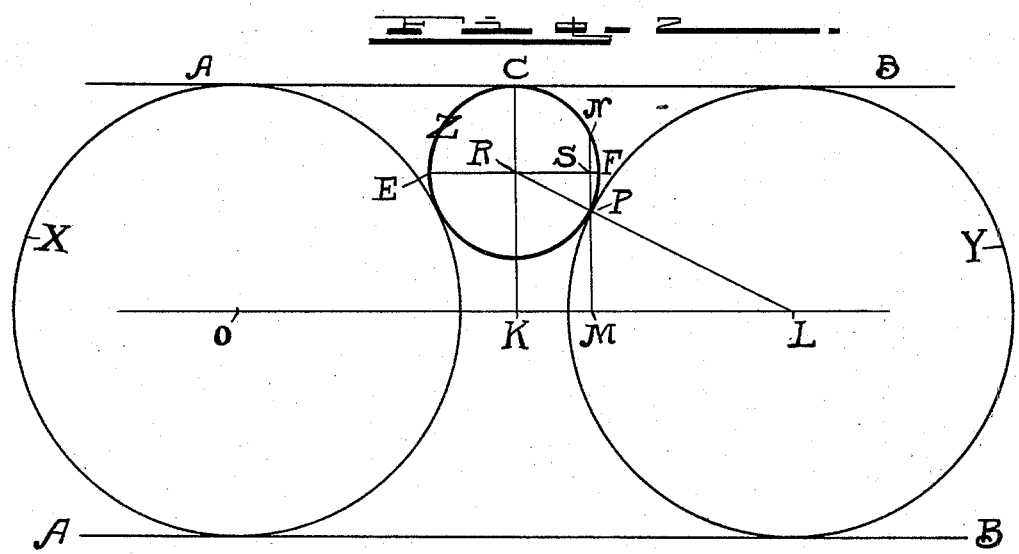
Witnesses
F. W. Koerner.
Zula Green.
Inventor
John E. Higdon
By V. H. Lockwood
His Attorney.

UNITED STATES PATENT OFFICE.

JOHN E. HIGDON, OF INDIANAPOLIS, INDIANA.

BALL-BEARING.

SPECIFICATION forming part of Letters Patent No. 585,574, dated June 29, 1897.

Application filed March 18, 1897. Serial No. 628,081. (No model.)

*To all whom it may concern:*

Be it known that I, JOHN E. HIGDON, of Indianapolis, county of Marion, and State of Indiana, have invented a certain new and useful Ball-Bearing; and I do hereby declare that the following is a full, clear, and exact description thereof, reference being had to the accompanying drawings, in which like figures refer to like parts.

The chief object sought to be accomplished by this invention is the prevention of all sliding contact between a ball and the parts within which it operates and to so make the parts that any modification or adjustment of their position or alteration in the size of the balls will in no wise affect or defeat this object. In such bearings the only sliding contact possible is between the balls themselves, for which, however, there is in the nature of things no remedy.

The avoidance of the sliding contact referred to is very valuable in nearly all bearings where it is needful to use balls. Sliding contact creates friction, which, to the extent of such friction, reduces the value of the bearing. It also causes wear of the balls and the parts within which they operate, and this wear not only increases the friction materially, but loosens and alters the relation of the parts.

Besides the above chief feature there are other features of invention in what is herein shown, whose nature, however, will be fully understood from the accompanying drawings and the description and claims following.

Figure 1 is a central longitudinal section of my bearing adapted especially for use in a bicycle. Fig. 2 is a geometrical diagram illustrating the principle that underlies the chief feature of my invention above mentioned.

For the purpose of illustrating my invention I have shown the same adapted for use in a bicycle, although obviously it can be used elsewhere.

In Fig. 1 I show a wheel-hub 1 internally threaded for some distance at its end. Into the end of this hub I screw a cup 2, on whose inner end a radially-extending annular flange 3 is provided.

4 is the shaft, provided with threads at 5 to receive the collar or nut 6, whose diameter or dimensions must be such as to permit its removal through the opening in the annular collar or flange 3 of the cup 2. From the threaded portion 5 to the end of the shaft its diameter is uniform. Over this portion I slip a sleeve 7. A radial flange or collar 8 is secured to the inner end of said sleeve, and in it I secure one or more pins 9, that penetrate suitable holes in the nut 6. This construction is intended to limit the inward movement of the sleeve 7 and to hold it in place, at the same time permitting said sleeve to be radially withdrawn when its outer end is released, as the pins 9 will radially slip out of the nut 6. On the sleeve 7 there is also another radial annular extension 10, rigidly secured in any suitable manner, with a pair of horizontal rims 11 and 12, between which and the annular flange or collar 3 a suitable race is formed for the ball 13. This is to take up any lateral strain or thrust. It is to be understood that a similar bearing is provided at the other end of the shaft 4, so that when the two bearings of said hub are properly adjusted the bearings between the ball 13 and the annular flange 3 of the cup at the two ends will coöperate for the purpose above mentioned. The outer end of the sleeve 7 is externally threaded. On this I screw, in the first place, a spherical segment 14, provided with an outwardly-extending collar 15, that is both internally and externally threaded. On the collar 15 I screw another spherical segment 16, that is a mate to 14, the spherical surfaces of which oppose each other. On the outer periphery of each of these spherical segments I place an annular extension or flange 19, on which I screw a ring 20 for the purpose of preventing the escape of the balls 21 when the bearings are removed from the hub.

The spherical segments 14 and 16 are held in place on the sleeve 7 by the lock-nut 22. The fork of a rear brace 23 envelops the shaft 4 between the nut 24 on the outer end of the sleeve 7 and the nut 25 on the outer end of the shaft 4. The location of the bearing as a whole is altered by turning the nut 24 and sleeve 7 so that the nut 6 will move inward or outward somewhat. By tightening up the nut 25, whereby the fork 23 is jammed against the nut 24 and the sleeve 7, and it against the nut 6, these parts will be held tight. The bearing is covered by the covering 26, that screws on the outer end of the cup 2 and has a lip that extends inward into a groove 27 in the outer spherical segment 16.

In placing the bearing the first thing to do is to introduce the cup 2. Then the nut 6 is placed on the shaft 4, the sleeve 7 slipped into place with the ball 13 inserted, and the inner spherical segment 14 screwed onto the sleeve. Then the balls 21 are inserted and the spherical segment 16 is put into place. The sleeve 7 then with all the parts mounted on it is slipped over the shaft 4 into place, the nut 22 tightened up so that the balls 21 will contact so as to roll freely, and the covering 26 secured in place, after which the nut 24, fork 23, and nut 25 are placed as above described.

The parts are removed by removing the nut 25, fork 23, and covering 26. Then the whole construction that is mounted upon the sleeve 7 can be slipped out of the hub. The balls 21 can be readily removed and balls of a different size substituted. The space between the spherical segments can be readily adjusted to accommodate any size of ball by adjusting the outer spherical segment 16. Any such adjustment will in no wise affect the operation of the bearings so far as the prevention of slipping of the balls on the parts is concerned.

The essential feature of the spherical segments is that the spheres of which they are segments must have a diameter equal to the internal diameter of the cup 2. This is indicated by the dotted circles in Fig. 1.

That a bearing constructed as above described will operate as stated will appear from the following geometrical demonstration. Let A B be a plane section of the inner face of the cup 2. Let the circles X and Y represent circular sections of the spheres containing the segments 16 and 14, respectively, and the circle Z represents a circular section of the ball 21. Let O L be the axis on which the spheres X and Y are carried and also the center around which A B or the cup 2 would revolve. The radius of the circles X and Y would be equal to the radius of the cup 2. Let the circle Z be in contact with the line A B and the two circles X and Y. Draw a line from L, the center of the circle Y, to R, the center of the circle Z. Draw a line C K also from the point of contact of the circle Z with the line A B perpendicular to the axis O L. Said line will pass through the center of the circle Z. Draw a line M N parallel to C K from the line O L intersecting L R at P, the point of contact between the circles Y and Z. Draw a diametrical line E F through the circle Z perpendicular to the lines C K and M N and parallel to A B and O L, intersecting the line M N at S. Let P' represent the contact-point between the circles X and Z.

Assuming now that the spheres of which X and Y are segments be stationary on the axis O L, while the cup 2, or A B, revolves about them, it is clear that the ball Z will rotate on the diameter E F, because the spheres are of the same diameter and the contact-points P and P' are equidistant from E F. The line of contact of the ball Z with A B will describe a circle on A B whose radius is C K, and on the ball Z a great circle whose radius is C R. The line of contact between the ball Z and the sphere Y on the latter is a small circle whose radius is P M, and on the ball Z a small circle whose radius is P S. In order that there may be no sliding contact between the ball Z and A B or the spheres X and Y, it is necessary that the circumference whose radius is C K—in other words, the inner circumference of the cup 2—be as many times the circumference whose radius is C R—in other words, the great circle of the ball Z—as the circumference of the small circle on the sphere Y, whose radius P M, is times the circumference of the small circle on the ball Z whose radius is P S. That is, the following proportion must be preserved: $CK : CR :: PM : PS$, for in the right triangles P S R and P M L, M P L and R P S are equal angles and M L P and P R S are equal angles. Hence the lines $PL : PR :: PM : PS$; but P L equals C K and P R equals C R. Therefore by substitution $CK : CR :: PM : PS$. Now if the circle Z be reduced and the circles X and Y brought together to be in contact with Z, or if this be reversed, P S R and P M L will remain similar right triangles, and C K will remain equal to P L, so that the proportions will be unchanged.

Stated concretely, the diameter of the cup 2 bears the same ratio to the diameter of the ball 21 as the diameter of the circle of contact on the spherical segments bears to the diameter of the circle of contact on the ball by such segments, or, stated otherwise, exactly the same time will be required for the cup 2 to roll once around on the ball 21 as for said ball to roll around once on the segmental spheres, and it is observed that if the spheres be brought closer together smaller balls must be used, but the true proportion will still be preserved, or by further separating the spheres and increasing the size of the balls the same proportion will still be retained. This is not true of any bearing where spherical segments are used whose circle is substantially greater or less than the internal diameter of the cup 2. Nor would it be true where cones were used instead of spherical segments, for, while it may be possible accidentally to arrange a bearing where at the outset the true proportion would exist, either wear or adjustment or change of balls would destroy the true proportions, and hence the bearings of these two classes, as well as any of the bearings between an inner straight surface parallel with an outer straight surface or between two inner or two outer surfaces or between an inner and an outer and side surfaces, will require the ball in every revolution to slide upon some or all the contact-surfaces. This is what is sought to be overcome and prevented by my invention, and it can be said that the law of construction of my bearing is definite and certain, whereby the desired freedom from sliding contact is obtained.

What I claim as my invention, and desire to secure by Letters Patent, is—

1. A ball-bearing whose ball race or receptacle is formed by a cylindrical cup and a pair of spherical segments within the same whose spherical faces oppose each other and the diameter of whose spheres, if extended, would be substantially equal to the internal diameter of the cup.

2. In a ball-bearing a cylindrical cup, a pair of spherical segments within the same to form the ball race or receptacle whose spherical faces oppose each other and the diameter of whose spheres, if extended, would substantially equal the internal diameter of the cup, and means for adjusting the distance between such spherical segments.

3. A ball-bearing comprising a cylindrical cup, a pair of spherical segments within the same whose spherical faces oppose each other and the diameter of whose spheres, if extended, would be substantially equal to the diameter of the cup, suitable balls between the spherical segments and cup, and means for adjusting one of said spherical segments so that the balls will contact with both of said spherical segments and the inner face of the cup.

4. In a ball-bearing a cylindrical cup, a pair of spherical segments whose spherical faces oppose each other to form a ball race or receptacle, the inner one of said spherical segments being provided with an outwardly-extending externally-threaded collar, and the outer one of said segments being provided with a centrally-threaded aperture whereby it can be screwed on the collar of said inner spherical segment.

5. In a ball-bearing, the combination with the shaft, of a collar secured thereon having one or more horizontal holes in it, and a sleeve on which the parts of the bearing are mounted that slips on said shaft and has on its inner end one or more pins to enter the holes in said collar, and means for holding said sleeve on the shaft.

6. In a ball-bearing, the combination with the shaft, of a collar secured thereon having one or more horizontal holes in it, and a sleeve on which the parts of the bearing are mounted that slips over the end of said shaft and has on its inner end one or more pins to enter the holes in said collar, said sleeve being externally threaded, suitable bearings for the balls screwed onto said sleeve, and means for holding said sleeve on the shaft.

7. In a ball-bearing, the combination with the shaft, of a collar secured thereon having one or more horizontal holes in it, an externally-threaded sleeve on which the parts of the bearing are mounted that slips over the end of said shaft and has on its inner end one or more pins to enter the holes in said collar, a spherical segment with an outwardly-extending collar screwed onto said sleeve, a mating spherical segment screwed on the collar of the other spherical segment, a lock-nut on said sleeve to hold the said segments in place, and means for holding said sleeve on the shaft.

8. In a ball-bearing, a cylindrical cup having at its inner end a radially-extending annular flange, a shaft provided with a nut small enough to pass through such cup and having one or more holes in it, a sleeve that will slide over the end of said shaft having on its inner end pins to enter the holes in said nut, and a radial extension outside the flange on said cup provided with a race opposing said flange, one or more balls in said race, suitable bearings for balls secured on said sleeve, balls between said bearings and cup, and means for holding the sleeve in place on the shaft.

In witness whereof I have hereunto set my hand this 10th day of March, 1897.

JOHN E. HIGDON.

Witnesses:
V. H. LOCKWOOD,
ZULA GREEN.